United States Patent [19]

Liu

[11] Patent Number: 5,079,098

[45] Date of Patent: Jan. 7, 1992

[54] PRIMER FOR BONDING LOW SURFACE ENERGY PLASTICS WITH CYANOACRYLATE ADHESIVES AND BONDING METHOD EMPLOYING SAME

[75] Inventor: Ju C. Liu, Newington, Conn.

[73] Assignee: Loctite Corporation, Hartford, Conn.

[21] Appl. No.: 504,062

[22] Filed: Mar. 30, 1990

Related U.S. Application Data

[63] Continuation of Ser. No. 168,712, Mar. 16, 1988, abandoned.

[51] Int. Cl.$^5$ .............................................. B32B 27/30
[52] U.S. Cl. ............................ 428/522; 106/287.25; 106/287.28; 106/287.3; 156/314; 156/331.2; 427/301; 427/302; 427/412.3; 526/298
[58] Field of Search .............. 156/3.4, 331.2, 307.3; 427/301, 302, 412.3; 526/298; 428/522; 564/291; 106/287.3, 287.25, 287.28

[56] References Cited

U.S. PATENT DOCUMENTS

| | | | |
|---|---|---|---|
| 2,897,170 | 7/1959 | Gruber | 428/522 |
| 3,332,816 | 7/1967 | Kalinowski | 156/314 |
| 3,706,691 | 12/1974 | Duffy et al. | 252/364 |
| 4,460,759 | 7/1984 | Robins | 156/331.2 |

FOREIGN PATENT DOCUMENTS

| | | |
|---|---|---|
| 129068 | 12/1984 | European Pat. Off. . |
| 2950523 | 6/1980 | Fed. Rep. of Germany . |
| 49-12094 | 3/1974 | Japan . |
| 50-28536 | 3/1975 | Japan .................. 156/314 |
| 53-35744 | 4/1978 | Japan . |
| 57-25378 | 2/1982 | Japan . |

OTHER PUBLICATIONS

"Adhesion Between Alkyl 2-Cyanoacrylates and Bone Pretreated with 1% Citric Acid," Kilpikari, J., et al. Adv. Biometer 1982, vol. 4 (Clin. Appl. Biomater.), pp. 101–105.

*Primary Examiner*—John J. Gallagher
*Attorney, Agent, or Firm*—Steven J. Hultquist

[57] ABSTRACT

The invention relates to a quaternary ammonium salt primer for bonding surfaces with cyanoacrylate adhesives, and to a method of bonding surfaces using such quaternary ammonium compounds, particularly surfaces characterized by low surface energy values, such as polyolefins and rubber-modified polyolefins. A preferred quaternary salt is tetra n-butyl ammonium fluoride. Preferred solvents for the quaternary ammonium salt are non-aqueous, low surface tension organic solvents.

37 Claims, No Drawings

PRIMER FOR BONDING LOW SURFACE ENERGY PLASTICS WITH CYANOACRYLATE ADHESIVES AND BONDING METHOD EMPLOYING SAME

CROSS-REFERENCE TO RELATED APPLICATION

This is a continuation of U.S. application Ser. No. 168,712 filed Mar. 16, 1988, now abandoned.

BACKGROUND OF THE INVENTION

1. Field of The Invention

This invention relates to a quaternary ammonium salt primer for bonding of surfaces with cyanoacrylate adhesives, and to a method of bonding surfaces utilizing such primer, particularly surfaces which are characterized by low surface energy values, such as polyolefins, or which are otherwise difficult to bond with conventional cyanoacrylate adhesives.

2. Description of the Related Art

In the adhesives field, cyanoacrylate adhesive compositions have come into wide-spread usage, due to their rapid fixturing properties and their high bonding strength characteristics, e.g., tensile shear strength. Such compositions typically fixture within a few minutes or less, and exhibit tensile shear strength values which for metal-to-metal bonding may be on the order of from about 1,000 to 3,000 psi, as measured by the lap shear strength determination method of ASTM D-1002-64.

While cyanoacrylate adhesives have enjoyed usage for bonding of a wide variety of substrate materials, such as metals, wood, glass, ceramics, metals, semi-metals, and combinations and composites thereof, there exist a number of substrate materials of construction which are extremely difficult to bond with cyanoacrylate adhesives or, indeed, with most other adhesives. Such difficult-to-bond substrate materials include low surface energy plastics such as polyethylene, polypropylene, etc., and highly crystalline materials such as polyacetals, polybutylene terephthalate, etc. As a consequence of the difficulty in bonding these materials with cyanoacrylate adhesives, various surface treatments have been employed where such materials require bonding and cyanoacrylate adhesives are otherwise desirably employed.

Examples of such surface treatments include corona discharge exposure of the substrate surface, acid etching, plasma treatment, and the like. These methods are generally unsatisfactory, requiring complex, costly, and substantially non-portable equipment such as corona discharge apparatus or plasma chambers, and/or handling of noxious, toxic, or corrosive fluids in the case of chemical etching of the substrate surface.

In view of the aforementioned deficiencies associated with physical and/or chemical surface roughening techniques, primer compositions have been developed which are applied to the hard-to-bond substrate surface(s), prior to application of the cyanoacrylate bondant medium thereto.

U.S. Pat. No. 4,460,759 to J. Robins, issued July 17, 1984, discloses an adhesive composition comprising an adhesive base which includes an alpha-cyanoacrylate and a stabilizer, in combination with an accelerator including a weakly acidic or weakly basic ionic accelerator compound of the formula MA, wherein M is a cation whose $pk_a$ in aqueous medium is at least about 10, and A is an anion whose $pk_a$ in deprotonation equilibrium reaction is less than or equal to about 0. A has a nucleophilicity constant of less than about 2 when the cation M is an onium cation comprising more than about 8 carbons, the nucleophilicity constant being determined relative to methyl iodide. The adhesive composition has a set time less than one third of that of the adhesive base alone and an overlap shear value of at least 400 lbs per square inch.

Among the cation M species disclosed in the above-mentioned patent are onium cations such as quaternary ammonium cations (see column 4, lines 42-49 of the patent). Illustrative anion A species are exemplified in Table 11 bridging columns 4 and 5 of the patent, as well as the disclosure at column 5, lines 8-15 of the patent.

European Patent Application 129,068 published Dec. 27, 1984 discloses a primer said to be useful for bonding non-polar or highly crystalline substrates together, or for bonding another material, such as a solid material, coating material, paint or printing ink to the substrate, by an alpha-cyanoacrylate. As examples of such difficult-to-bond substrate materials, this publication mentions polyethylene, polypropylene, polybutene, polyfluoroethylene, and their copolymers, as well as other polymeric substrates such as polyethylene terephthalate, polyacetal, nylon and soft (highly plasticized) PVC film. The disclosed primer comprises one or more organometallic compounds, such as metal alcoholates; 1,3-dicarbonyl complexes, carboxylates, hydrocarbon group-containing metal compounds, and heteroatom-containing organometallic compounds. The disclosure at page 2, line 10 to page 3, line 4 of this European Patent Application also describes various prior art primer compositions for enhancing adhesion characteristics of difficult-to-bond substrates. These prior art primer compositions include organic acid solutions of chlorinated polyethylene or chlorinated polypropylene, and fatty acid-modified acrylated alkyd resins.

Japanese Kokai 82/25,378 published Feb. 10, 1982, discloses of solutions of rubber and isocyanates in organic solvents as primers for alpha-cyanoacrylate adhesives.

Kil Pikari, J., et al, *Adv. Biomater.* 1981, Vol. 4 pp. 101-105, "Adhesion Between Alkyl 2-Cyanoacrylates and Bone Pretreated with 1% Citric Acid," discloses the pretreatment of bone surfaces with 1% citric acid, tartaric acid, or succinic acid, to attempt to improve the adhesion of poly(alkyl 2-cyanoacrylate) thereto. These pretreatments are said not to improve the adhesion strength of the cyanoacrylate bone bond.

West German Offenlegungsschrift 2,950,523 published June 19, 1980, discloses a method of binding urethane formulations to rubber, by coating the rubber surface with a liquid cyanoacrylate adhesive, covering the wet adhesive layer with a polyurethane formulation, and hardening the polyurethane.

Japanese Kokai 74/12,094 published Mar. 22, 1974, describes the treatment of aluminum, polyester, and other substrates, with diethylamine, o-phenylenediamine, or a similar compound, to improve adhesion of such surface to poly(ethyl alpha-cyanoacrylate).

Japanese Kokai 78/35,744 published Apr. 3, 1978, describes the use of polymethyl meth(acrylate) solution in dimethyl ketone as an adhesive composition for porous substrates, e.g., wood, for cyanoacrylate adhesive bonding thereof.

In addition to the above-described primer compositions for enhancing cyanoacrylate adhesive bonding of various substrates, there have been efforts in the art to incorporate in the cyanoacrylate bonding medium additives which function as adhesion promotors for enhancing the bondability of substrates with cyanoacrylate adhesives. Such additives may, however, significantly increase the fixturing time of the cyanoacrylate adhesive composition, thereby adversely affecting the utility of the composition in specific applications, or such additives may limit the utility of cyanoacrylate compositions containing same to bonding of only specific substrate materials, without effecting any improvement in the cyanoacrylate adhesive bondability of other substrate materials.

Accordingly, there is a continuing need in the art for an improved primer composition for achieving enhanced bondability of various substrates with cyanoacrylate adhesives, particularly low surface energy materials or otherwise difficult-to-bond surfaces.

It is therefore an object of the present invention to provide a primer composition which facilitates the cyanoacrylate adhesive bonding of substrate materials such as polyolefins and rubber-modified polyolefins, and which may be useful in bonding a wide variety of low surface energy materials or otherwise difficult-to-bond surfaces.

It is another object of the invention to provide a method of bonding substrates, including surfaces characterized by low surface energy values or otherwise of difficult-to-bond character, by applying to such surfaces a primer composition of a type enhancing the cyanoacrylate adhesive bondability of such surfaces.

Other objects and advantages of the invention will be more fully apparent from the ensuing disclosure and appended claims.

SUMMARY OF THE INVENTION

In one aspect, the present invention relates to a primer composition having utility when applied to a substrate, particularly a surface characterized by a surface-free energy of less than about 30 dynes per centimeter, of enhancing the adhesiveness of the substrate surface, the primer comprising a quaternary ammonium compound of the formula:

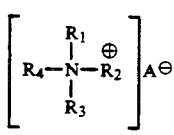

wherein: $R_1$, $R_2$, $R_3$ and $R_4$ may each vary independently of the others and are selected from the group consisting of alkyl, hydroxyalkyl, aryl, alkaryl, aralkyl, and alkenyl, optionally substituted with heteroatoms; and $A^-$ is an anion whose $pK_a$ value in deprotonation equilibrium reaction is greater than about 0. Such quaternary ammonium compound containing primer may comprise, as a suitable vehicle or carrier medium, a non-aqueous, low surface tension organic solvent.

In another aspect, the present invention relates to a two-part adhesive composition, comprising:

(a) a primer comprising (i) a quaternary ammonium compound of the formula:

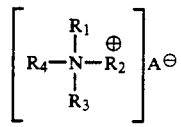

wherein: $R_1$, $R_2$, $R_3$, and $R_4$ may each vary independently of the others and are selected from the group consisting of alkyl, hydroxyalkyl, aryl, alkaryl, aralkyl, and alkenyl, optionally substituted with heteroatoms; and $A^-$ is an anion whose $pK_a$ value in deprotonation equilibrium reaction is greater than about 0; and (ii) a non-aqueous, low surface tension organic solvent; and (b) a bondant comprising a polymerizable alpha-cyanoacrylate monomer.

Still another aspect of the invention relates to a method for adhesively bonding a substrate element with an alpha-cyanoacrylate bondant, comprising applying to a surface of the substrate element to be adhesively bonded with said bondant, an adhesion enhancingly effective coupling agent of the formula:

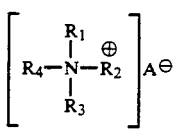

wherein $R_1$, $R_2$, $R_3$, and $R_4$ may each vary independently of the others and are selected from the group consisting of alkyl, hydroxyalkyl, aryl, alkaryl, aralkyl, and alkenyl, optionally substituted with heteroatoms; and wherein $A^-$ is an anion whose $pK_a$ value in deprotonation equilibrium reaction is greater than about 0.

A further aspect of the invention relates to a bonded assembly comprising a substrate element with a surface having coated thereon an adhesion enhancingly effective coupling agent as described hereinabove, and with the surface coated with such coupling agent being adhesively bonded in the assembly by an alpha-cyanoacrylate bondant.

Other aspects and features of the invention will be more fully apparent from the ensuing disclosure and appended claims.

DETAILED DESCRIPTION OF THE INVENTION, AND PREFERRED EMBODIMENTS THEREOF

The present invention is based on the discovery that the adhesiveness of various substrate surfaces for bonding with alpha-cyanoacrylate bondants may be substantially enhanced by applying to the surface to be bonded, an adhesion enhancingly effective coupling agent of the formula:

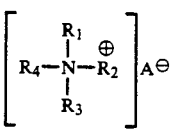

wherein $R_1$, $R_2$, $R_3$ and $R_4$ may each vary independently of the others and is selected from the group consisting of alkyl, hydroxyalkyl, aryl, alkaryl, aralkyl, and alkenyl, optionally substituted with heteroatoms.

Such coupling agent is most advantageously employed in a solvent-based primer composition comprising as the solvent, a non-aqueous, low surface tension organic solvent.

As used herein, the term "adhesiveness" refers to the adhesive affinity of a substrate surface for an alpha-cyanoacrylate bondant.

The terms "low surface energy" used in reference to substrate materials and "low surface tension" used in reference to organic solvents, refer respectively to substrate materials and organic solvents characterized by surface free energy values of less than about 30 dynes per centimeter.

The term "adhesion enhancingly effective" used in reference to the quaternary ammonium compound ("coupling agent") of the invention means that such compound effects a higher degree of adhesiveness of the alpha-cyanoacrylate bondant to the substrate surface than would be realized in the absence of such compound.

In the quaternary ammonium compounds of the above formula, utilized as adhesion enhancingly effective coupling agents for cyanoacrylate adhesives in the broad practice of the present invention, $R_1$, $R_2$, $R_3$ and $R_4$ may, by way of example, be $C_1$-$C_{22}$ alkyl or hydroxyalkyl, and preferably are $C_1$-$C_8$ alkyl, with n-butyl being a highly preferred alkyl substitutent for each of the $R_1$-$R_4$ groups. The preferred alkyl groups may be either straight-chained or branched in character, however, branching, if present, preferably is at an outer portion of the substitutent group, to avoid undesirable steric effects.

As indicated, the anion $A^-$ in the quaternary ammonium compound of the above formula is an anion whose $pK_a$ in deprotonation equilibrium reaction is greater than about 0.

As used herein, $pK_a$ refers to the $pK_a$ numerical value determined in accordance with the procedure described in A. Streitwieser and J. H. Hammons, Prog. Phys. Org. Chem., 3, 41(1965), in a solvent medium in which fluorine and diphenylmethane, as reference compounds, have $pK_a$ values of about 22.6 and 34.1, respectively.

As used herein, the $pK_a$ values for the anion of the quaternary ammonium compound "in deprotonation equilibrium reaction" refers to the $pK_a$ of the anion $A^-$ in the equilibrium defined by

$$HA \rightleftharpoons A^- + H^+$$

and this $pK_a$ value is greater than about 0.

The foregoing $pK_a$ criterion in deprotonation equilibrium reaction, i.e., that the $pK_a$ is greater than about 0, is in distinction to the $pK_a$ value less than or equal to about 0 which is required for the anion in the ionic accelerator compound of the aforementioned U.S. Pat. No. 4,460,759. In contrast to the ionic accelerator compound characteristics determined to be necessary for effective bonding of wood substrates with cyanoacrylate adhesives in such patent, the present invention requires an anion whose $pK_a$ value is greater than that disclosed in such reference, to achieve enhanced cyanoacrylate adhesive bonding of substrates including difficult-to-bond materials such as polyolefins and low surface energy materials. As used herein, "low surface energy" used in reference to substrate materials or substrate surfaces means that such materials or surfaces have a surface-free energy which is generally less than about 30 dynes per centimeter.

The anions which are compatible with the quaternary ammonium moiety of the coupling agent compound and which meet the aforementioned $pK_a$ criterion, and produce adhesion enhancingly effective compounds, include, by way of illustration, hydroxide, methoxide, fluoride, phosphate, borohydride, cyanoborohydride, hexaphorophosphate, cyanate, acetate, and cyanide. In general, coupling agents comprising chloride, bromide, iodide, and periodate anionic moieties do not accelerate fixture time or promote increased bond strength of cyanoacrylate adhesives on difficult-to-bond substrate surfaces such as polyolefins, though they may be suitable in application to other substrate materials requiring cyanoacrylate adhesive bonding.

The above-described quaternary ammonium compounds may be employed as adhesion enhancingly effective coupling agents for a wide variety of substrate surfaces, and may be applied to such surfaces in any suitable manner satisfactory to effect enhanced adhesion of the cyanoacrylate bondant to the substrate surface. Generally, however, for ease of application, it is preferred to apply the quaternary ammonium compounds to the substrate surfaces to be bonded, in the form of a solution of the quaternary ammonium compound in a suitable liquid carrier medium. It will be appreciated that in some instances it may be advantageous to utilize primer formulations containing two or more different quaternary ammonium compounds.

Such carrier medium should be non-aqueous in character, suitably being characterized by low surface tension, and suitably comprising an organic solvent. In contrast to the water or alcohol solutions of the ionic accelerator compounds disclosed in the aforementioned U.S. Pat. No. 4,460,759, a low surface tension solvent is required in the practice of the present invention when the substrates to be bonded include polyolefinic or other low surface energy materials. It has been determined that the use of water or alcohol, as taught by the aforementioned patent, has detrimental effects on adhesive bonding strength, in application to cyanoacrylate bonding of such polyolefinic or other low surface energy surfaces.

In this respect, the use of only methanol as the liquid carrier medium for the quaternary ammonium compounds has been found to yield low performance bondability, whereas the use of a solvent containing only a minor fraction of methanol, e.g., Freon ® TMS solvent, containing 3%-5% by weight of methanol, based on the total weight of the solvent, has been found to provide satisfactorily enhanced bondability of polyolefin and rubber-modified polyolefin substrates with cyanoacrylate adhesives.

Solvents generally useful to form primer formulations of the quaternary ammonium compounds of the invention, include polyolefin-swelling solvents, most preferably chlorinated solvents. Examples of suitable solvents include trichloroethane (TCE), tetrahydrofuran (THF), Freon ® (trichlorotrifluoroethane) solvents, e.g., Freon ® TA and Freon ® TMS, methylene chloride, and toluene. It will be appreciated that the solvent may be either a single component solvent, or a multicomponent mixture of solvent constitutents, as for example a solvent mixture including a major fraction of a base solvent such as TCE or Freon ® solvent, and a minor fraction, e.g., 5% by weight based on the weight of the base solvent, of a solvent such as 2,2-dimethoxypropane.

Beneficial results have been obtained where the surface free energy of the solvent employed as the carrier medium for the quaternary ammonium compound is close to the free energy of the surface to be coated with the primer solution, e.g., a solvent surface free energy within about 20%, preferably within about 10%, of the surface free energy of the substrate surface to be adhesively bonded with the cyanoacrylate adhesive.

The resulting primer solution comprising the quaternary ammonium compound and solvent carrier medium, may be applied to the substrate surface to be bonded with the cyanoacrylate adhesive, in any suitable manner, as for example by spraying, dipping, brushing, swabbing, wiping, rollercoating, etc.

After application of the quaternary ammonium primer to the surfaces of the substrates to be adhesively bonded, the cyanoacrylate adhesive composition may be applied to the primered surfaces, and the substrates then may be brought into mated relationship with one another, to effect adhesive bonding of the constitutent substrate elements and form the bonded product assembly. It may be suitable to apply the cyanoacrylate adhesive composition to only one of the substrate surfaces to be bonded, and then to mate the respective substrate elements for bonding to one another.

Depending on the compositions of the respective substrate elements, such as where one of the elements is a readily cyanoacrylate-bondable material, and the other is a difficult-to-bond material, it may be necessary or desirable to apply the quaternary ammonium primer to only one (viz., the difficult-to-bond one) of the surfaces to be bonded.

It will be generally desirable to mate the cyanoacrylate adhesive-bearing substrate surfaces with one another as promptly as possible after the cyanoacrylate adhesive composition has been applied to one or both of the substrate elements.

The thicknesses of the primer and adhesive layers utilized in the broad practice of the present invention may be varied widely, depending on the character and composition of the substrate surfaces to be cyanoacrylate-bonded, the compositions of the primer and adhesive, the nature of the end-use application for the bonded assembly, etc. The specific thickness suitably employed in a particular application may readily be determined without undue experimentation, by simple lapshear tensile shear strength determinations for samples of varying thicknesses.

In some instances, multiple applications of the primer may advantageously be utilized, but in most cases one primer application is sufficient. As regards the adhesive thickness, it generally has been found satisfactory in the broad practice of the invention when employing polyolefin and rubber-modified polyolefin substrates, to utilize cyanoacrylate adhesive thicknesses of from about 5 to about 10 mils.

Depending on the substrate to be adhesively bonded, and the specific quaternary ammonium compound employed, the concentration of the quaternary ammonium compound in solvent solution may be varied widely to apply a selected concentration of the compound on the surface to be adhesively bonded. In general, however, it is satisfactory to employ solutions of the quaternary ammonium compound containing from about 0.01% to about 10% by weight of the quaternary ammonium compound, based on the weight of solvent in the solution, preferably from about 0.05% to about 5% by weight of the quaternary ammonium compound, and most preferably from about 0.05% to about 2.0% by weight of the quaternary ammonium compound, on the same solvent weight basis.

A preferred quaternary ammonium compound in the practice of the invention is tetra n-butyl ammonium fluoride (TBAF), which may be advantageously employed in chlorinated organic solvents such as described hereinabove, at a concentration which may for example be on the order of about 0.25% by weight of TBAF, based on the weight of the solvent. Another preferred solvent-based primer composition comprises as the quaternary ammonium constituent thereof, tetra n-butyl ammonium fluoride at a concentration of from about 0.05% to about 2.0% by weight, and tetrabutyl ammonium acetate at a concentration of from about 0.05% to about 1.0% by weight, based on the weight of the solvent in the primer composition.

The specific surface concentration of the quaternary ammonium compound which is adhesion enhancingly effective for cyanoacrylate bonding of the substrate surface may readily be determined without undue experimentation by those skilled in the art, based on simple tests such as the determination of bonding strengths at varying concentrations, e.g., by the tensile shear strength method of ASTM D-1002-64. In general, it is desired to apply the quaternary ammonium compound at a lowest possible concentration, for reasons of economy and ease of application, and to get as close as possible to the application of a monomolecular layer of the compound to the substrate.

Consistent with the above-described characteristics, the organic ammonium compounds useful as coupling agents in the broad practice of the present invention suitably are characterized by a pH of greater than 7 in solution, preferably greater than about 9.

The low surface energy substrate materials to which the quaternary ammonium compounds of the invention are most advantageously applied for enhanced adhesion of cyanoacrylate bondants thereto, include: polyolefins such as polypropylene, polyethylene, and polybutylene; EDPM rubber; composite rubber materials, such as the microdispersed polypropylene/EDPM rubber material commercially available under the trademark Santoprene ® from Monsanto Company (St. Louis, Mo); polyacetals; polyesters, e.g., polybutylene terephthalate; polyamides, e.g., nylon; fluorocarbon polymers, e.g., Teflon ® polytetrafluoroethylene (E. I. duPont de Nemours and Company, Inc., Wilmington, Delaware); etc., including combinations and composites of such materials, and copolymers of the monomers of such polymers.

Especially preferred as substrate materials for cyanoacrylate bonding with the quaternary ammonium primer of the invention are the polyolefins, including homopolyolefins, copolyolefins, and high impact or rubber-modified polyolefins.

In addition to the aforementioned substrate materials of construction, which are illustratively set forth above and not to be limitingly construed, suitable substrate materials of construction with which the quaternary ammonium compounds and primers of the invention are potentially useful, include metal, glass, leather, ceramic, stone, fabric, wood, paper, and combinations and composites thereof. As indicated, it may be suitable in many instances to bond a pair of matable surfaces to one another, wherein one of the surfaces is of a low surface energy character, to which the quaternary ammonium compounds and primers of the invention may be usefully applied, with the other surface being of higher surface energy and more readily adhesively bonded with cyanoacrylate adhesives without such application of the quaternary ammonium compounds or primers thereto.

The quaternary ammonium compounds of the invention may be utilized in combination with any other additives or components which do not preclude the efficacy of the quaternary compounds for their intended purpose. Examples of such further components which may be usefully employed with the quaternary compounds per se or in quaternary compound-containing primer compositions according to the present invention, include antioxidants, stabilizers, plasticizers, surfactants, anti-corrosion materials, fluorescent dyes (for primer coverage verification under fluorescent illumination of the primed surface), etc.

The cyanoacrylate adhesive compositions which may be suitably employed in the broad practice of the present invention include any suitable cyanoacrylate adheseive compositions which are compatible with the primers of the present invention and the specific substrate materials of construction for the surfaces to which the primer is applied. Illustrative cyanoacrylate adhesive compositions which may potentially be employed in practicing the present invention include, but are not limited to, the cyanoacrylate adhesive compositions disclosed in the following U.S. Pat. Nos.: 4,386,193; 4,170,585; 4,424,387; 4,321,180; 4,196,271; 3,699,127; and 3,836,377.

The features and advantages of the present invention will be more clearly understood by reference to the following examples, which are not to be construed as limiting the invention.

EXAMPLE I

The quaternary ammonium compounds identified in Table I were tested for enhancement of the adhesiveness of polypropylene (PP) and Santoprene ® rubber (S) substrates for bonding with cyanoacrylate adhesives. The organic ammonium compounds were applied to the substrates in solvent solution, by brushing of the solution on the surfaces to be bonded, at the concentrations indicated in Table I (column (a)). The Block Tensile Shear Strength, in psi, was determined for the bonded substrates in accordance with the procedure of ASTM D-1002-64, yielding the tensile shear strength results shown in Table I. Also set out in this Table (column (e)) are the $pK_a$ values for the anions of the quaternary ammonium compounds tested; these tabulated values were taken from March, J., "Advanced Organic Chemistry," p. 219, McGraw-Hill Inc., 1968, and Gordon, A. J., and Ford, R. A., "The Chemist's Companion," p. 58, Wiley-Interscience, 1972.

As shown by the data in Table I, benzyltrimethylammonium hydroxide, tetra n-butylammonium fluoride (TBAF), tetrabutylammonium acetate (TBAA), and tetrabutylammonium cyanide were most effective in bonding the polypropylene and Santoprene ® rubber substrate surfaces. The primers characterized by $pK_a$ values of less than 0 exhibited poor bonding (low block tensile shear strength values), in contrast to compounds characterized by $pK_a$ values greater than 0. As a control for comparison purposes, unprimed bonded polypropylene surfaces yielded block tensile shear strength values on the order of 20–40 psi.

TABLE I

| Organic Ammonium Compound | (a) | (b) | (c) | (d) | (e) |
|---|---|---|---|---|---|
| Tetrabutyl ammonium hydroxide | 0.125 | T | PP | 446 | 16 |
| Benzyltrimethyl ammonium methoxide | 0.2 | M | PP | 227 | 16 |
| Benzyltrimethyl ammonium hydroxide | 0.2 | M | PP | 1089 | 16 |
| Tetrabutyl ammonium fluoride | 0.125 | T | PP | 703 | 3.2 |
|  | 0.25 | T | PP | 1685 |  |
|  | 0.5 | T | PP | 1360 |  |
| Tetrabutyl ammonium hydrogen phosphate | 0.5 | M | PP | 184 | 2.12 |
| Tetrabutyl ammonium periodate | 0.5 | M | PP | 38 | −5 |
| Benzyltributyl ammonium bromide | 0.5 | M | PP | 45 | −9 |
| Tetrabutyl ammonium hexafluorophosphate | 0.5 | M | PP | 21 | −5 |
| Tetrabutyl ammonium tetrafluoroborate | 0.5 | M | PP | 35 | −5 |
| Tetrabutyl ammonium acetate | 0.5 | T | PP | 1328 | 5 |
| Tetrabutyl ammonium cyanide | 0.5 | T | PP | 1389 | 9.1 |
| Tetramethylammonium fluoride | 0.2 | FE | PP | 447 | 3.2 |
|  |  |  | LDPE | 159 |  |
|  |  |  | S | 1137 |  |
| Tetrahexylammonium benzoate | 0.25 | FMS | PP | 2876 | 5 |
|  |  |  | LDPE | 739 |  |
|  |  |  | S | 1314 |  |

(a) Concentration of compound in solvent
(b) Solvent: T(trichloroethane), M ($CH_2Cl_2$), FE (Freon ® TE-35), or FMS (Freon ® TMS)
(c) Substrate: PP (polypropylene), S (Santoprene ® rubber), or LDPE (low density polyethylene)
(d) Block Tensile Shear Strength, in psi
(e) $pK_a$ for anion

EXAMPLE II

Various substrate surfaces were treated by brush application thereto of a primer composition containing 1.5% of 1M tetrahydrofuran (THF) solution of TBAF and 0.25% TBAA in Freon ® TMS solvent, to determine the cyanoacrylate bondability achieved by primer compositions of the invention, as measured by Block Tensile Shear Strength. Cure conditions were room temperature conditions. Santoprene ® rubber, polypropylene, low density (LD) polyethylene, and high density (HD) polyethylene, Delrin ® polyacetal, Valox ® polybutylene terephthalate, and Teflon ® polytetrafluoroethylene were tested. As shown by the tensile shear strength values in Table II, this primer composition was effective in yielding high tensile strength values for the various cyanoacrylate-bonded substrates tested.

TABLE II

| Substrate | Block Tensile Shear Strength, psi |
|---|---|
| Santoprene ® 203-50 | 1766 |
| Polypropylene | 3775 |
| Polyethylene LD | 1163 |
| Polyethylene HD | 941 |
| Delrin ® | 813 |
| Valox ® | 1308 |
| Teflon ® | 748 |

EXAMPLE III

As shown in Table III, tests on mixed substrates were performed with a variety of substrate pairs being treated with a TBAF/TBAA primer comprising 1.5% TBAF in 1 molar THF solution/0.25% TBAA in Freon ®  TMS solvent, and the cyanoacrylate adhesive was evaluated under cure conditions of either room temperature or 82° C. The following substrates were tested: Santoprene ® rubber; acrylonitrile-butadiene styrene (ABS); sandblasted steel; aluminum (Scotchbrite ® abrasive polished); polypropylene; Teflon ® polytetrafluoroethylene; high and low density polyethylene; Delrin ® polyacetal and Valox ® polybutylene terephthalate. All substrates were solvent washed with trichloroethane prior to priming. The block tensile shear strength values are set out in Table III below.

TABLE III

| Substrate Pair | Cure Conditions[a] | Block Tensile Shear Strength[b] |
|---|---|---|
| Santoprene ®[*c]-Santoprene ®[*] | RT | 1580 |
| Santoprene ®[*]-Santoprene ®[*] | H | 1660 |
| Santoprene ®[*]-ABS[*] | RT | 619 |
| Santoprene ®-ABS[*] | H | 475 |
| Santoprene ®[*]-Steel | RT | 861 |
| Santoprene ®[*]-Steel | H | 464 |
| Santoprene ®-Aluminum | RT | 521 |
| Santoprene ®-Aluminum | H | 15 |
| Polypropylene[*]-Steel | RT | 977 |
| Teflon ®-Steel | RT | 702 |
| Polyethylene HD-Steel | RT | 592 |
| Polyethylene LD-Steel | RT | 717 |
| Delrin ®-Steel | RT | 552 |
| Valox ®-Steel | RT | 1141 |

[a]RT: Room Temperature; H: High temperature (82° C.)
[b]All values are psi
[c]Substrate failure is indicated by "*"

While the invention has been described with reference to specific embodiments thereof, it will be appreciated that numerous variations, modifications, and embodiments are possible, and accordingly all such variations, modifications, and embodiments are to be regarded as being within the spirit and scope of the invention.

What is claimed is:

1. A two-part composition for bonding surfaces, comprising:
   (a) a cyanoacrylate adhesive; and
   (b) a primer comprising at least one quaternary ammonium compound of the formula:

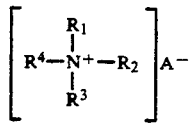

wherein:
   $R_1$, $R_2$, $R_3$, and $R_4$ may each vary independently of the others and are each selected from the group consisting of alkyl, hydroxyalkyl, aryl, alkaryl, aralkyl, and alkenyl, optionally substituted by heteroatoms; and
   $A^-$ is an anion whose $pK_a$ value in deprotonation equilibrium reaction is at least 2.12.

2. A two-part composition according to claim 1, wherein A is selected from the group consisting of hydroxide, methoxide, fluoride, phosphate, borohydride, cyanoborohydride, hexaphorophosphate, cyanate, acetate, cyanide, benzoate, and mixtures thereof.

3. A two-part composition according to claim 1, comprising multiple quaternary ammonium compounds.

4. A two-part composition according to claim 1, wherein the quaternary ammonium compound comprises tetra n-butyl ammonium fluoride.

5. A two-part composition according to claim 1, wherein the quaternary ammonium compound comprises tetra butyl ammonium acetate.

6. A two-part composition according to claim 1, wherein the quaternary ammonium compound comprises a mixture of tetra n-butyl ammonium fluoride and tetra butyl ammonium acetate.

7. A two-part composition according to claim 6 further comprising a solvent for the quaternary ammonium compound, wherein the tetra n-butyl ammonium fluoride has a concentration of from about 1.0% to about 2.0% by weight, and the tetra butyl ammonium acetate has a concentration of from about 0.1% to about 1.0% by weight, based on the weight of the solvent.

8. A two-part composition according to claim 1, wherein the primer further comprises a chlorinate hydrocarbon solvent for the quaternary ammonium compound.

9. A two-part composition according to claim 1, wherein the primer further comprises trichloroethane as a solvent for the quaternary ammonium compound.

10. A two-part composition according to claim 1, wherein the primer further comprises trichlorotrifluoroethane as a solvent for the quaternary ammonium compound.

11. A two-part composition for adhesively bonding surfaces, comprising:
   (a) a bondant comprising a polymerizable alpha-cyanoacrylate monomer; and
   (b) a coupling agent consisting essentially of at least one quaternary ammonium compound of the formula:

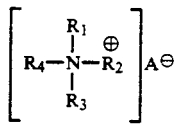

wherein:
   $R_1$, $R_2$, $R_3$, and $R_4$ may each vary independently of the others and are each selected from the group consisting of alkyl, hydroxyalkyl, aryl, alkaryl, aralkyl, and alkenyl, optionally substituted by heteroatoms; and
   $A^\ominus$ is an anion whose $pK_a$ value in deprotonation equilibrium reaction is at least 2.12;
   said coupling agent being dissolved in a non-aqueous organic solvent having a surface tension of less than 30 dynes/cm, and containing no more than a minor fraction of lower alcohol(s).

12. A two-part composition according to claim 11, wherein A is selected from the group consisting of hydroxide, methoxide, fluoride, phosphate, borohydride, cyanoborohydride, hexaphorophosphate, cyanate, acetate, cyanide, benzoate, and mixtures thereof.

13. A two-part composition according to claim 11, wherein said coupling agent comprises multiple quaternary ammonium compounds.

14. A two-part composition according to claim 11, wherein the quaternary ammonium compound comprises tetra n-butyl ammonium fluoride.

15. A two-part composition according to claim 11, wherein the quaternary ammonium compound comprises tetrabutyl ammonium acetate.

16. A two-part composition according to claim 11, wherein the quaternary ammonium compound comprises tetra n-butyl ammonium fluoride and tetrabutyl ammonium acetate.

17. A two-part composition according to claim 16, wherein the tetra n-butyl ammonium fluoride has a concentration of from about 1.0% to about 2.0% by weight, and the tetrabutyl ammonium acetate has a concentration of from about 0.1% to about 1.0% by weight, based on the weight of solvent.

18. A two-part composition according to claim 11, wherein the organic solvent comprises a chlorinated hydrocarbon.

19. A two-part composition according to claim 11, wherein the organic solvent is selected from the group consisting of trichloroethane, tetrahydrofuran, trichlorotrifluoroethane, methylene chloride, toluene, and mixtures thereof.

20. A two-part composition according to claim 11, wherein the organic solvent comprises trichlorotrifluoroethane.

21. A substrate element having a cyanoacrylate-bonded surface which has been treated prior to cyanoacrylate bonding with a coupling agent consisting essentially of a quaternary ammonium compound of the formula:

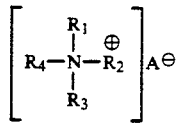

wherein:

$R_1$, $R_2$, $R_3$, and $R_4$ may each vary independently of the others and are each selected from the group consisting of alkyl, hydroxyalkyl, aryl, alkaryl, aralkyl, and alkenyl, optionally substituted by heteroatoms; and $A^{\ominus}$ is an anion whose $pK_a$ value in deprotonation equilibrium reaction is at least 2.12;

said coupling agent being dissolved in a non-aqueous organic solvent having a surface tension of less than 30 dynes/cm, and containing no more than a minor fraction of lower alcohol(s).

22. A method for adhesively bonding a substrate surface with an alpha-cyanoacrylate bondant, comprising:

(a) applying to the substrate surface, at least one adhesion enhancingly effective coupling agent consisting essentially of a quaternary ammonium compound of the formula:

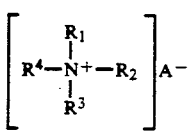

wherein:

$R_1$, $R_2$, $R_3$, and $R_4$ may each vary independently of the others and are each selected from the group consisting of alkyl, hydroxyalkyl, aryl, alkaryl, aralkyl, and alkenyl, optionally substituted by heteroatoms; and $A^-$ is an anion whose $pK_a$ value in deprotonation equilibrium reaction is at least 2.12;

said coupling agent being dissolved in a non-aqueous organic solvent having a surface tension of less than 30 dynes/cm, and containing no more than a minor fraction of lower alcohol(s); and (b) after application thereto of said coupling agent, bonding the substrate surface to another bonding surface with an alpha-cyanoacrylate bondant.

23. A method according to claim 22, wherein $A^{\ominus}$ is selected from the group consisting of hydroxide, methoxide, fluoride, phosphate, borohydride, cyanoborohydride, hexaphorophosphate, cyanate, acetate, cyanide, benzoate, and mixtures thereof.

24. A method according to claim 22, utilizing multiple coupling agents.

25. A method according to claim 22, wherein the coupling agent comprises tetra n-butyl ammonium fluoride.

26. A method according to claim 22, wherein the coupling agent comprises tetrabutyl ammonium acetate.

27. A method according to claim 22, wherein the coupling agent comprises tetra n-butyl ammonium fluoride and tetrabutyl ammonium acetate.

28. A method according to claim 27, wherein the tetra n-butyl ammonium fluoride has a concentration of from about 1.0% to about 2.0% by weight, and the tetrabutyl ammonium acetate has a concentration of from about 0.1% to about 1.0% by weight, based on the weight of the solvent.

29. A method according to claim 22, wherein the organic solvent comprises a chlorinated hydrocarbon.

30. A method according to claim 22, wherein the organic solvent is selected from the group consisting of trichloroethane, tetrahydrofuran, trichlorotrifluoroethane, methylene chloride, toluene, and mixtures thereof.

31. A method according to claim 22, wherein the organic solvent comprises trichlorotrifluoroethane.

32. A method according to claim 22, further comprising pretreating the surface of the substrate before applying said coupling agent thereto.

33. A method according to claim 32, wherein said pretreating comprises solvent washing said substrate surface.

34. A bonded assembly including first and second surfaces bonded to one another by a cyanoacrylate adhesive, and with at least one of said surfaces prior to bonding having been treated with a coupling agent consisting essentially of a quaternary ammonium compound of the formula:

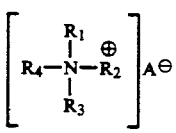

wherein:

$R_1$, $R_2$, $R_3$, and $R_4$ may each vary independently of the others and are each selected from the group consisting of alkyl, hydroxyalkyl, aryl, alkaryl, aralkyl, and alkenyl, optionally substituted by heteroatoms; and $A^-$ is an anion whose $pK_a$ value in deprotonation equilibrium reaction is at least 2.12;

said coupling agent being dissolved in a non-aqueous organic solvent having a surface tension of less than 30 dynes/cm, and containing no more than a minor fraction of lower alcohol(s);

said at least one of said surfaces having a surface free energy of less than 30 dynes/cm; and said solvent having a surface free energy within about 20% of the surface free energy of said at least one of said surfaces.

35. A bonded assembly according to claim 34, wherein $A^{\ominus}$ is selected from the group consisting of hydroxide, methoxide, fluoride, phosphate, borohydride, cyanoborohydride, hexaphorophosphate, cyanate, acetate, cyanide, benzoate, and mixtures thereof.

36. A bonded assembly according to claim 34, wherein at least one of said surfaces is formed of a material selected from the group consisting of polypropylene, rubber containing microdispersed polypropylene, polyethylene, and fluoroalkylene polymers.

37. A bonded assembly according to claim 34, wherein both of said surfaces have a surface free energy of less than 30 dynes/cm.

* * * * *

UNITED STATES PATENT AND TRADEMARK OFFICE
CERTIFICATE OF CORRECTION

PATENT NO. : 5,079,098
DATED : January 7, 1992
INVENTOR(S) : Ju C. Liu

It is certified that error appears in the above-identified patent and that said Letters Patent is hereby corrected as shown below:

Column 2, line 15, change " Table 11" to --Table II--.

Column 3, lines 44-45 after "centimeter" delete --.--.

Column 11, line 50, change the formula as follows:

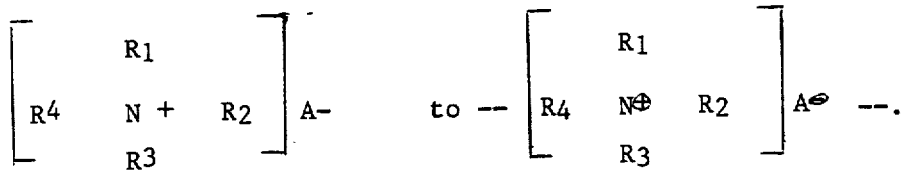

Column 12, line 20, change "chlorinate" to --chlorinated--.

Column 13, lines 55-65, change the formula as follows:

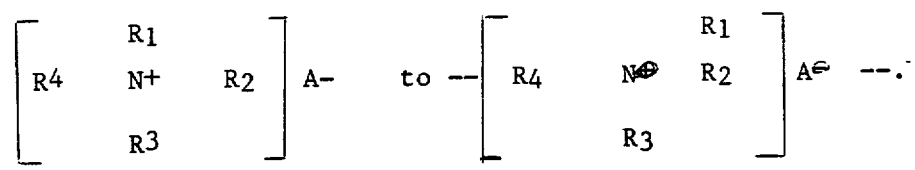

Signed and Sealed this

Eleventh Day of October, 1994

Attest:

BRUCE LEHMAN

*Attesting Officer*     *Commissioner of Patents and Trademarks*